United States Patent
Boyd et al.

(10) Patent No.: US 11,334,224 B2
(45) Date of Patent: May 17, 2022

(54) DETERMINING VARIATIONS OF SINGLE-PAGE APPLICATIONS

(71) Applicant: Optimizely, Inc., San Francisco, CA (US)

(72) Inventors: Whelan Jefferson Boyd, San Francisco, CA (US); Zachary Leach, San Francisco, CA (US); James Frazier Fox, San Francisco, CA (US)

(73) Assignee: Optimizely, Inc., San Francisco, CA (US)

( * ) Notice: Subject to any disclaimer, the term of this patent is extended or adjusted under 35 U.S.C. 154(b) by 0 days.

(21) Appl. No.: 16/261,402

(22) Filed: Jan. 29, 2019

(65) Prior Publication Data

US 2019/0278438 A1    Sep. 12, 2019

Related U.S. Application Data

(60) Provisional application No. 62/641,037, filed on Mar. 9, 2018.

(51) Int. Cl.
*G06F 3/0483* (2013.01)
*H04L 67/60* (2022.01)
*H04L 67/146* (2022.01)

(52) U.S. Cl.
CPC .......... *G06F 3/0483* (2013.01); *H04L 67/146* (2013.01); *H04L 67/32* (2013.01)

(58) Field of Classification Search
None
See application file for complete search history.

(56) References Cited

U.S. PATENT DOCUMENTS

| | | | | |
|---|---|---|---|---|
| 7,231,606 B2* | 6/2007 | Miller | ...... | H04L 43/50 715/738 |
| 7,844,894 B2* | 11/2010 | Khopkar | ...... | G06Q 30/00 715/234 |
| 7,895,293 B1* | 2/2011 | Vasilik | ...... | G06Q 30/0241 705/14.4 |
| 8,543,900 B1* | 9/2013 | Kent | ...... | H04L 67/22 705/14.43 |
| 8,839,093 B1* | 9/2014 | Siroker | ...... | G06F 16/958 715/234 |
| 9,400,774 B1* | 7/2016 | Kim | ...... | G06F 16/22 |

(Continued)

OTHER PUBLICATIONS

MDN Web Docs, "MutationObserver.observe()," 2019, 4 pages, [Online][Retrieved Feb. 1, 2019], Retrieved from the internet <URL: https://developer.mozilla.org/en-US/docs/Web/API/MutationObserver/observe>.

(Continued)

*Primary Examiner* — Henry Orr
(74) *Attorney, Agent, or Firm* — Womble Bond Dickinson (US) LLP

(57) ABSTRACT

A single-page application of a content provider is associated with a smart page established on an experiment system to allow a variation test to be performed on the single-page application. The smart page is associated with a trigger that determines when one or more corresponding conditions of the single-page application should be evaluated. Responsive to one or more of the conditions of the single-page application being satisfied, either an original version of the single-page web page or a variant of the single-page web page may be displayed.

17 Claims, 16 Drawing Sheets

(56) References Cited

U.S. PATENT DOCUMENTS

| | | |
|---|---|---|
| 10,725,888 B2 * | 7/2020 | DiTullio .................. G06F 8/72 |
| 2004/0122943 A1 * | 6/2004 | Error ....................... H04L 67/02 |
| | | 709/224 |
| 2009/0282343 A1 * | 11/2009 | Catlin .................... G06Q 30/02 |
| | | 715/738 |
| 2012/0265824 A1 * | 10/2012 | Lawbaugh .......... G06F 11/3664 |
| | | 709/206 |
| 2013/0290480 A1 * | 10/2013 | Manion ................... H04L 67/34 |
| | | 709/217 |
| 2015/0186521 A1 * | 7/2015 | Yavilevich ............ G06F 16/951 |
| | | 707/710 |
| 2016/0253311 A1 * | 9/2016 | Xu .......................... H04L 67/02 |
| | | 715/256 |
| 2016/0267509 A1 * | 9/2016 | Grosso ............... G06Q 30/0283 |
| 2017/0046110 A1 * | 2/2017 | He ............................ G06F 8/38 |
| 2017/0132123 A1 * | 5/2017 | DiTullio ............... G06F 11/362 |
| 2017/0168924 A1 * | 6/2017 | Dereszynski ....... G06F 11/3688 |
| 2017/0316432 A1 * | 11/2017 | Xu ..................... G06Q 30/0201 |
| 2017/0346758 A1 * | 11/2017 | Dimitropoulos ...... H04L 47/765 |

OTHER PUBLICATIONS

Stepanov, V., "Observe changes in DOM using MutationObserver," Mar. 28, 2018, 3 pages, [Online] [Retrieved Feb. 1, 2019], Retrieved from the internet <URL: https://codeburst.io/observe-changes-in-dom-using-mutationobserver-9c2705222751>.

* cited by examiner

DETERMINING VARIATIONS OF SINGLE-PAGE APPLICATIONS

1. CROSS-REFERENCE TO RELATED APPLICATIONS

This application claims benefit of U.S. Provisional Patent Application No. 62/641,037 filed on Mar. 9, 2018, which is incorporated by reference in its entirety.

2. TECHNICAL FIELD

The embodiments described herein pertain in general to conducting experiments on a web page or digital product and more particularly to conducting experiments for single-page applications.

3. BACKGROUND

Content variation testing is an experiment that tests changes to content against a current version of the content. One example of content variation testing is web page variation testing where an experiment is conducted that tests a web page (or one or more elements on the page) against another design of the web page (or one or more variations of the elements on the page). During variation testing of a web page, user interaction with a web page or its variations are measured (for example, whether a user clicks through a button or a variation of a button), and the changes to a web page (or its elements) that produce positive or negative results are determined. The positive results associated with a particular change to a web page validates that the change to the web page should be used in a production version of the web page.

However, conventional variation testing systems are designed to work with static web sites. A static web site is a web site for which navigation from one web page of the web site to another requires each web page to be downloaded and fully loaded from the web server. Conventional variation testing systems detect when the static web pages reload as visitors navigate the web pages. Conventional variation testing system detect when the web page on a static web site reloads in response to requesting the static web pages from a server and use the reloading of the web pages received from the server as trigger conditions to activate a variation experiment.

However, conventional variation testing systems are not designed to operate with single-page applications. A single-page application is a web application or web site that interacts with a client device by dynamically rewriting the current web page rather than loading entire new pages from a server. Single-page applications are intended to avoid interruption of the user experience between successive pages. In a single page-application, all the necessary code is typically retrieved with a single page load or the appropriate resources are dynamically loaded and added to the page as necessary, usually in response to user actions.

Conventional variation testing systems have difficulty conducting variation tests on single-page applications as the single-page applications load only once or because the header element of the single-page application loads only once and resources are dynamically loaded as necessary without reloading the entire page. However, the body of the application can change an unbounded number of times, typically as a result of user action. As a user navigates a single-page application (and changes the state of the page, either visibly or invisibly), conventional variation testing systems have difficulty detecting any trigger conditions to activate a variation experiment since the header element of the single-page application loads only once. Even if a condition is not true at first, it may become true as the visitor navigates through the site, but the client of a conventional variation testing system has no way of knowing when it should check again given that single-page applications load only once.

4. SUMMARY

The embodiments herein describe a variation testing system environment for performing variation testing of a single-page application. In order to support single-page application variation testing, third-party content providers of single-page applications are provided more granular control over activating and deactivating pages. An experiment system allows for configuration of triggers and conditions that offer a lightweight way for third-party content providers to configure when to activate and deactivate single-page applications at any point in the client lifecycle.

In one embodiment, a particular view of a single-page application of a third-party content provider is associated with a smart page established on the experiment system. In one embodiment, a smart page is associated with one or more views of a single-page web page (using, e.g., a URL or an element that is present in the view, or a JavaScript variable present in the view—which are conditions). The smart page may include a set of triggers (when to evaluate a condition) and conditions (whether a value on a particular view of a single-page web page is true or false). There are multiple types of triggers, and a user selects at least one per view or page, including "upon immediate page load", "manual", "when the URL changes", "when the DOM changes", "when a condition is true", and "when a callback fires," for example. Conditions include URL match, element present, and custom code.

When a trigger occurs on the single-page application, for the associated smart page with that trigger type, the client-side snippet will evaluate whether its conditions are satisfied. If the conditions are satisfied, the client-side snippet will activate the smart page and, subsequently, experiments or personalization campaigns associated with the smart page will run. If the conditions are not satisfied, the client-side snippet will not activate the smart page. If the smart page is already activated and the trigger occurs but conditions are not satisfied, then the client-side snippet will deactivate the smart page (if the "deactivatePage" setting is true for the page) and, optionally, will undo changes applied by an experiment or personalization campaign.

Features and advantages described in this summary and the following detailed description are not all-inclusive. Many additional features and advantages will be apparent to one of ordinary skill in the art in view of the drawings, specification, and claims hereof.

5. BRIEF DESCRIPTION OF THE DRAWINGS

FIGS. 3A-3J illustrate example user interfaces for configuring various parameters for a variation test for a single-page application, in accordance with an embodiment.

The figures depict various embodiments for purposes of illustration only. One skilled in the art will readily recognize from the following discussion that alternative embodiments of the structures and methods illustrated herein may be employed without departing from the principles described herein.

6. DETAILED DESCRIPTION

(a) System Architecture

Figure 1:
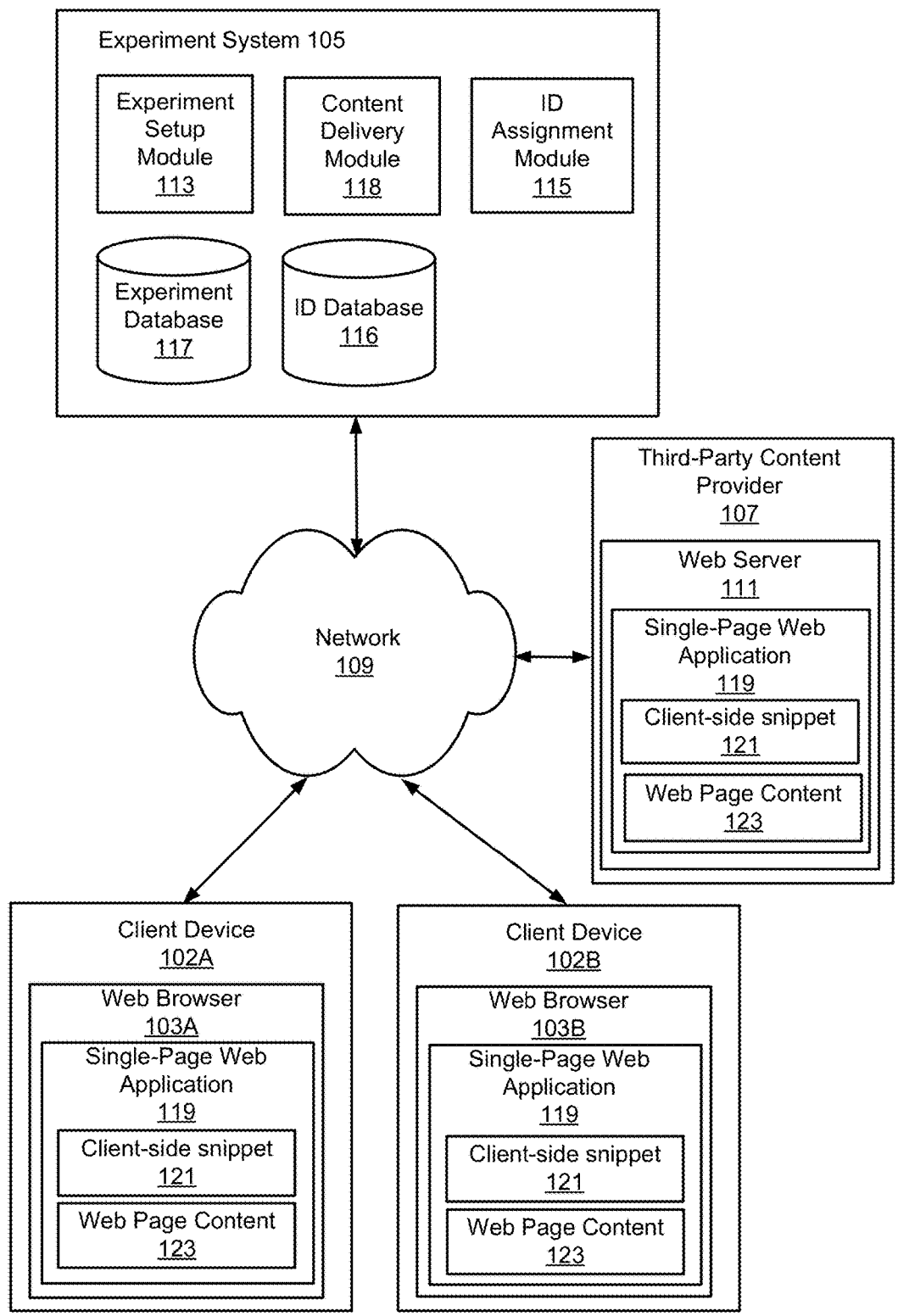
FIG. 1 is a block diagram of a variant testing system environment, in accordance with an embodiment.

FIG. 1 is a block diagram of a variant testing system environment 100 according to one embodiment. Environment 100 includes client devices 102 (e.g., client device 102A and client device 102B). In one embodiment, client device 102A is a device of a first user and client device 102B is a device of a second user. Client device 102A may represent one or more devices of the first user and client device 102B may represent one or more devices of the second user. Client devices 102 are connected to an experiment system 105 and a third-party content provider 107 via a network 109. Although the environment 100 shown in FIG. 1 only includes two client devices 102, the environment 100 can include any number of client devices (e.g., thousands of client devices 102).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

The network 109 enables communication among the entities connected to it. In one embodiment, network 109 is the Internet and uses standard communications technologies and/or protocols. Thus, network 109 can include links using technologies such as Ethernet, 802.11 (WiFi), worldwide interoperability for microwave access (WiMAX), 3G, Long Term Evolution (LTE), digital subscriber line (DSL), asynchronous transfer mode (ATM), InfiniBand, etc. Similarly, the networking protocols used on network 109 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 109 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In one embodiment, network 109 may include but is not limited to any combination of a local area network (LAN), a metropolitan area network (MAN), and a wide area network (WAN). In another embodiment, the entities use custom and/or dedicated data communications technologies instead of, or in addition to, the ones described above.

Client devices 102 communicate with the third-party content provider 107 via the network 109 to receive content items such as web pages from the third-party content provider 107. In one embodiment, each client device 102 is a computer system capable of communicating with the experiment system 105 and the third-party content provider 107. Examples of client devices 102 include a personal computer, a mobile phone, a tablet, a personal digital assistant (PDA), or a laptop. As shown in FIG. 1, each client device 102 includes a web browser 103 (e.g., web browser 103A and web browser 103B). The web browser 103 is a computer program stored on a client device 102 that allows the user of client 102 to access web pages on the World Wide Web such as single-page web applications 119 provided by the third-party content provider 107. Suitable web browsers include, but are not limited to, GOOGLE CHROME, MICROSOFT INTERNET EXPLORER, MICROSOFT EDGE, MOZILLA FIREFOX, and APPLE SAFARI.

As mentioned above, the environment 100 includes a third-party content provider 107. Hereinafter, the third-party content provider 107 is referred to as a "content provider 107" for ease of description. The content provider 107 may be an individual, a group of individuals, or an entity such as a company. In one embodiment, the content provider 107 provides content items to client devices 102. While only one content provider 107 is shown, it is understood that any number of content providers are supported and can be in the environment 100 at any time.

In one embodiment, the content items provided by the content provider 107 are included as part of a single-page application 119. For example, the content provider 107 may provide content items such as navigation bars, backgrounds, call to action buttons, links, CSS styles, pop-ups, video, audio, a combination of video and audio, still images (e.g., JPEG), text documents, advertisements, and/or any other types of content. For purposes of convenience and the description of one embodiment, the content items provided by the content provider 107 will be referred to as a single-page web pages, but no limitation on the type of content items are intended by this terminology. In one embodiment, a single-page web page refers to a view of a single-page web application 119. For example, a single-page web page may be the initial view of a single-page web application 119 when the user first loads the single-page web application 119 or the view when the user navigates over a navigation bar element and a menu is displayed in response to the navigation over the navigation bar.

In one embodiment, the content provider 107 operates in conjunction with the experiment system 105 to perform variation testing on a single-page web application 119 containing one or more single-page web pages. In one embodiment, the content provider 107 sends a single-page web page to client devices 102 together with a client-side snippet 121, which includes or subsequently downloads from the experiment system 105 conditions and instructions for modifying the single-page web page. A variation test for a single-page web page of a single-page web application 119 tests changes to the single-page web page against the current variation of the single-page web page (e.g., the original version of the single-page web page) to determine how the variation alters user interaction with the web page or whether the changes produce a desired result. An example of a desired result resulting from a change to a single-page web page is an increased interaction with the web page such as an increased selection of an advertisement(s) included in the single-page web page or increased purchases of a product advertised on a single-page web page. Thus, variation testing validates a new design of a single-page web page or changes on elements on the single-page web page before the new design or changes are put into production by the content provider 107.

For a given single-page web page, the content provider 107 may have an associated smart page that includes one or more variations of the single-page web page that are used in a variation test for the single-page web page. In one embodiment, a variation test of a single-page web page involves an experiment that tests control "A" and a variation "B" on users requesting the single-page web page from the content provider 107. For ease of discussion, the embodiments discussed herein describe a web page having only two variations: the control and the variant. However, in other embodiments, a single page web page can have any number of variations.

Figure 2B:
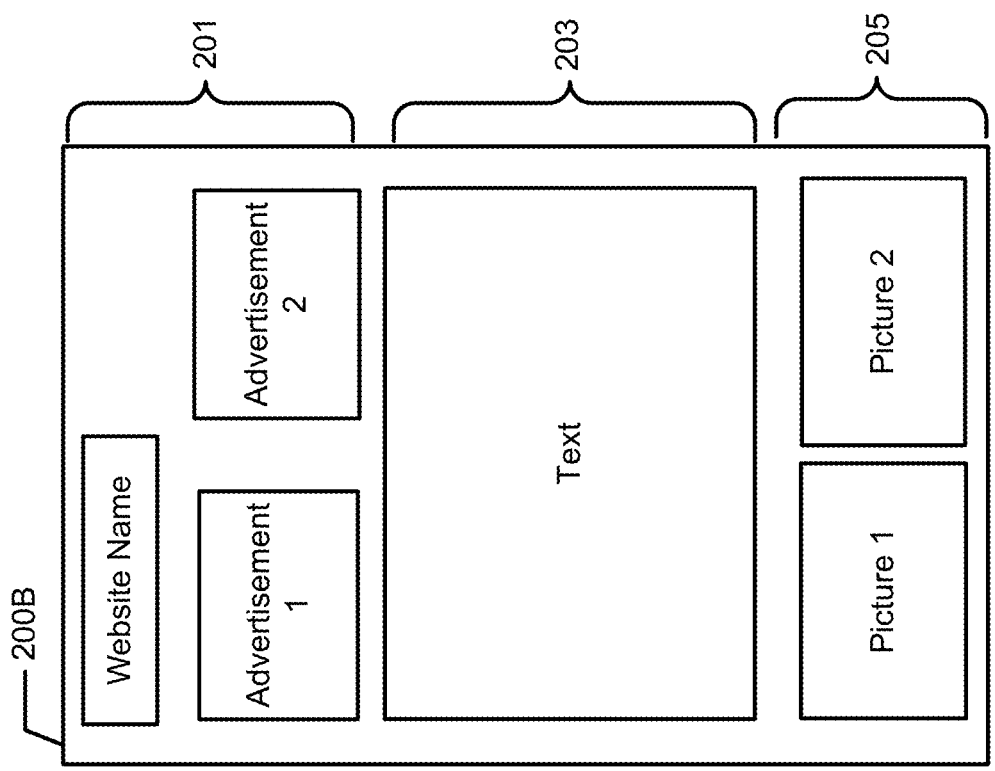
FIGS. 2A-2B illustrate example variations of a web page, in accordance with an embodiment.
Figure 2A:
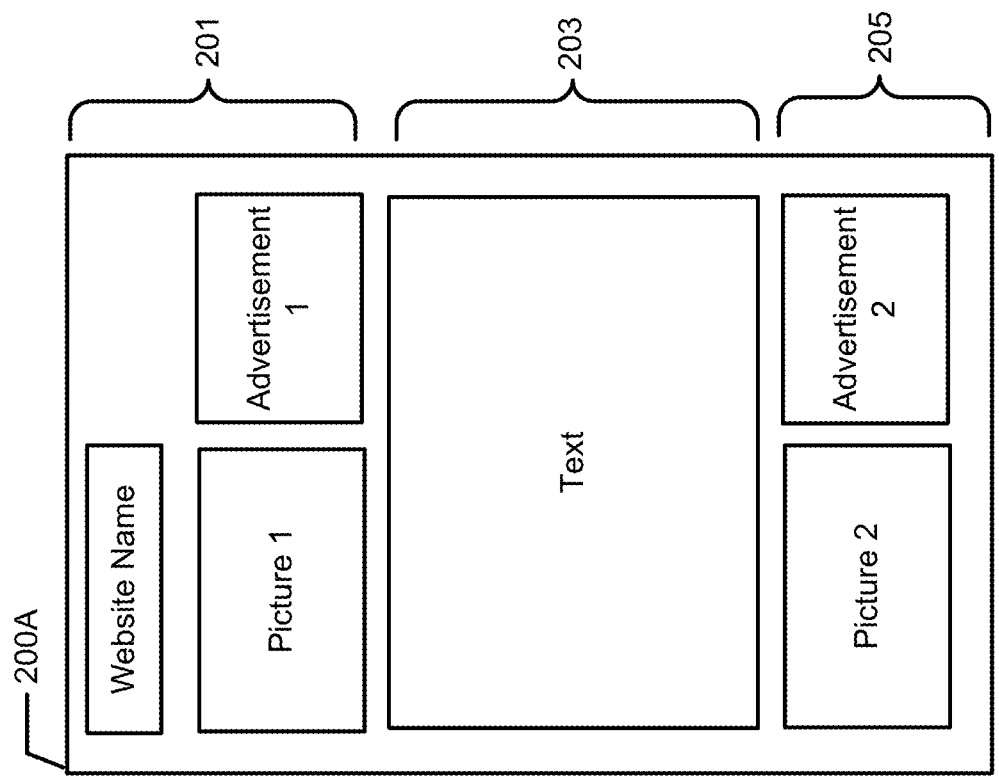

FIG. 2A is example "A" (e.g., the control) of a single-page web page 200A that represents the current implementation of the single-page web page provided by content provider 107. The control of the single-page web page 200A includes a website name of the website associated with the single-page web page, a first picture, and a first advertisement. The website name, the first picture, and the first advertisement are located in an upper portion 201 of the control of single-page web page 200A according to one embodiment. The control of single-page web page 200A also includes textual content located in a central portion 203 of the control of single-page web page 200A and the control of the single-page web page 200A also includes a second picture and a second advertisement located at a lower portion 205 of the control of the single-page web page 200A.

FIG. 2B is example "B" (e.g., the variant version) of a single-page web page 200B. The variant of the single-page web page represented by web page 200B includes a change (i.e., a modification) to the control of the single-page web page 200A shown in FIG. 2A. The variant of single-page web page 200B includes the website name, a first advertisement, a second advertisement, textual content, a first picture, and a second picture similar to the control of the single-page web page 200A shown in FIG. 2A. However, the variant of single-page web page 200B includes the second advertisement positioned in the upper portion 201 of single-page web page 200B whereas the second advertisement is positioned in the lower portion 205 in the control of the single-page web page 200A. In one embodiment, the variation test using the control and the variant of the single-page web page is conducted to determine whether the second advertisement receives more selections when the second advertisement is located at the lower portion 205 of the single-page web page as shown in FIG. 2A or when the second advertisement is located at the upper portion 201 of the single-page web page as shown in FIG. 2B.

Referring back to FIG. 1, in one embodiment the content provider 107 includes a web server 111. In one embodiment, the web server 109 links the content provider 107 to one or more client devices 102 and the experiment system 105 via the network 109. The web server 111 serves single-page web applications 119, as well as other web related content 123 for the single-page web application 119, such as Java, Flash, XML, and so forth. The web server 111 may include a mail server or other messaging functionality for receiving and routing messages between the experiment system 105 and one or more client devices 102. In one embodiment, a single-page web application 119 provided by the web server 109 may include a client-side snippet 121. The client-side snippet 121 may be added to the single-page web application 119 by the third-party content provider 107 in one embodiment. The client-side snippet 121 comprises code that loads experiment variation instructions from the experiment system 105.

As shown in FIG. 1, the variant testing system environment 100 also includes an experiment system 105. In one embodiment, the experiment system 105 establishes and conducts variation experiments for web pages included in single-page web applications 119 served by third party providers 107. In one embodiment, the experiment system 105 includes an experiment setup module 113, an ID assignment module 115, an ID database 116, an experiment database 117, and a content delivery module 118, according to one embodiment. As is known in the art, the term "module" refers to computer program logic utilized to provide the specified functionality. Thus, a module can be implemented in hardware, firmware, and/or software. In one embodiment, program modules are stored on a non-transitory storage device (i.e., a computer program product), loaded into a memory, and executed by one or more computer processors. Additionally, those of skill in the art will recognize that other embodiments of the experiment system 105 shown in FIG. 1 can have different and/or other modules than the ones described here, and that the functionalities can be distributed among the modules in a different manner.

In one embodiment, the experiment setup module 113 establishes experiments for single-page web applications 119 provided by the third-party content provider 107. The experiment setup module 113 receives input from an affiliate (e.g., an employee) of the third-party content provider 107 to establish a variation experiment for a single-page web page of a single-page web application 119 provided by the third-party content provider 107. In one embodiment, establishing a variation experiment for a single-page web page of a single-page web application 119 includes configuring a smart page for the single-page web page. In one embodiment, a smart page for a single-page web page is a set of instructions that describe when to activate a variation experiment associated with the single-page web page. The smart page may include one or more triggers and one or more conditions configured by the affiliate of the third-party content provider 107 that impact when variations of the associated single-page web page are selected and presented to a client device 102.

A smart page for a single-page web page may define one or more conditions. In one embodiment, a condition(s) for a smart page is a set of rules related to the state of the single-page web page that must be satisfied before the smart page for the single-page web page will activate. That is, a condition of a smart page describes the state of the world of the single-page web page that can be evaluated as true (i.e., valid) or false (i.e., invalid). Responsive to a condition being true, a smart page causes the performance of a specified action. For example, information included in the smart page specifies when and how to present experimental variants of the single-page web application 119 to viewing users if a condition in the smart-page is true. If a condition is false, the smart page may be deactivated if the smart page is currently active or the smart page may not be activated if not currently activated.

In one embodiment, a smart page for the single-page web page may also include at least one trigger. In one embodiment, a trigger defines when to evaluate the condition(s) for the smart page. That is, a trigger of a smart page is tied to an event on the single-page web page and signals a client device 102 to evaluate conditions associated with the trigger.

Smart pages may include one or more triggers that can be of different trigger types. When a trigger event occurs, the smart page evaluates the corresponding conditions associated with the trigger event.

Figure 3A:

The experiment setup module 113 provides user interfaces, as shown in FIGS. 3A-3J, to allow the affiliate of the third-party content provider 107 to set up the experiment, including setting up smart pages for single-page web pages of single-page web applications 119 provided by the third-party content provider. FIG. 3A illustrates an example interface 300 for initiating configuration of a smart page for a single-page web page according to one embodiment. Responsive to receiving input from an affiliate of the third-party content provider 107 indicating an instruction to establish a variation experiment for a single-page web application 119, the experiment setup module 113 generates the interface 300 for display on a client device of the affiliate of the third-party content provider 107. The interface 300 includes one or more fields for the affiliate to specify parameters for the smart page and variation experiment. As shown in FIG. 3A, the interface 300 allows the affiliate to identify a page name 303 and an editor URL 305 (e.g., the URL of the single-page web page being tested) as string inputs for the smart page. In one embodiment, the page name 303 and editor URL 305 fields are mandatory for creation of the smart page for the single-page web page.

The interface 300 additionally includes one or more fields allowing the affiliate to identify page settings 307 for the smart page, including one or more triggers and conditions for a variation experiment. Prior to receiving input from the affiliate, the interface 300 displays a default set of page settings 307. In one embodiment as shown, the default set of page settings 307 includes a trigger defining that a client device 102 immediately checks if any conditions are valid for a single-page web page and that no conditions exist for the smart page. In other embodiments, other default page settings 307 may be used.

Figure 3B:
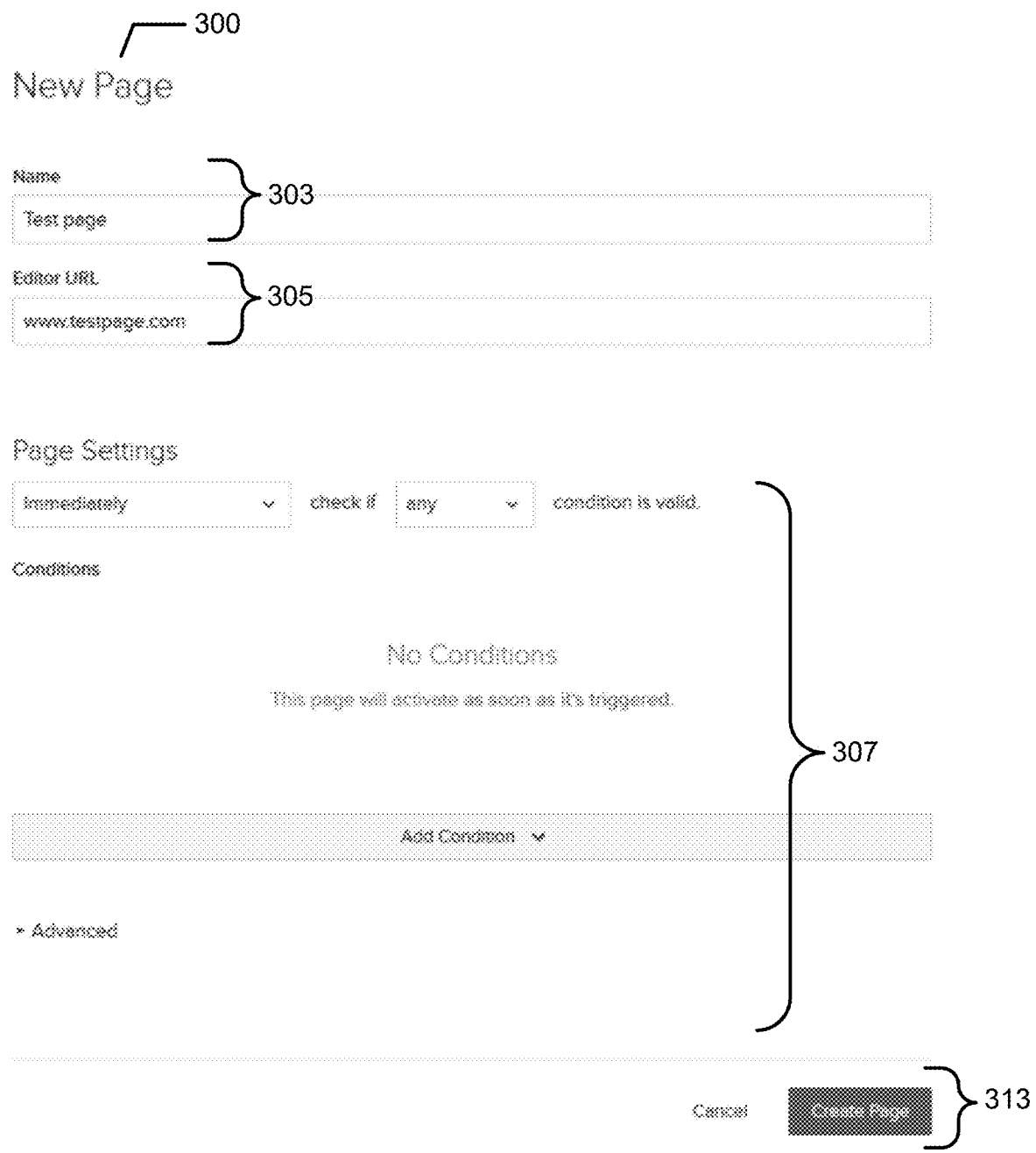

FIG. 3B illustrates an example interface 300 for configuring the smart page for the single-page web page. As shown in the example interface 300 of FIG. 3B, an affiliate of a content provider 107 identifies a page name ("Test page") 303 and an editor URL ("www.testpage.com") 305. Responsive to receiving input from the affiliate identifying the page name 303 and the editor URL 305 for the smart page, the experiment setup module 113 generates an updated example interface 300 including a default set of page settings 307 and a "Create Page" button 313 allowing the affiliate of the content provider 107 to create the smart page with the specified page name 303, editor URL 305, and page settings 307.

Figure 3C:
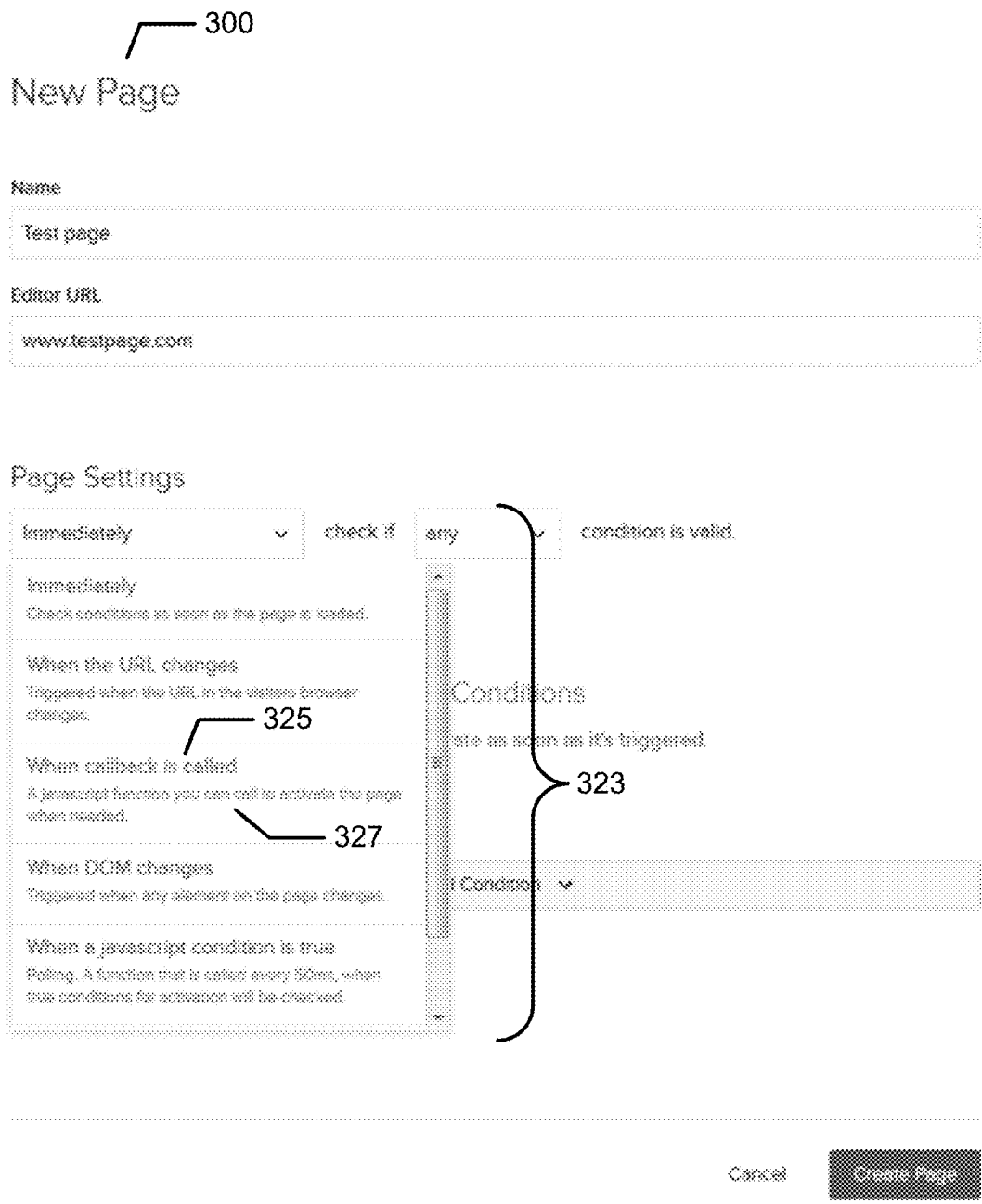
Figure 3D:
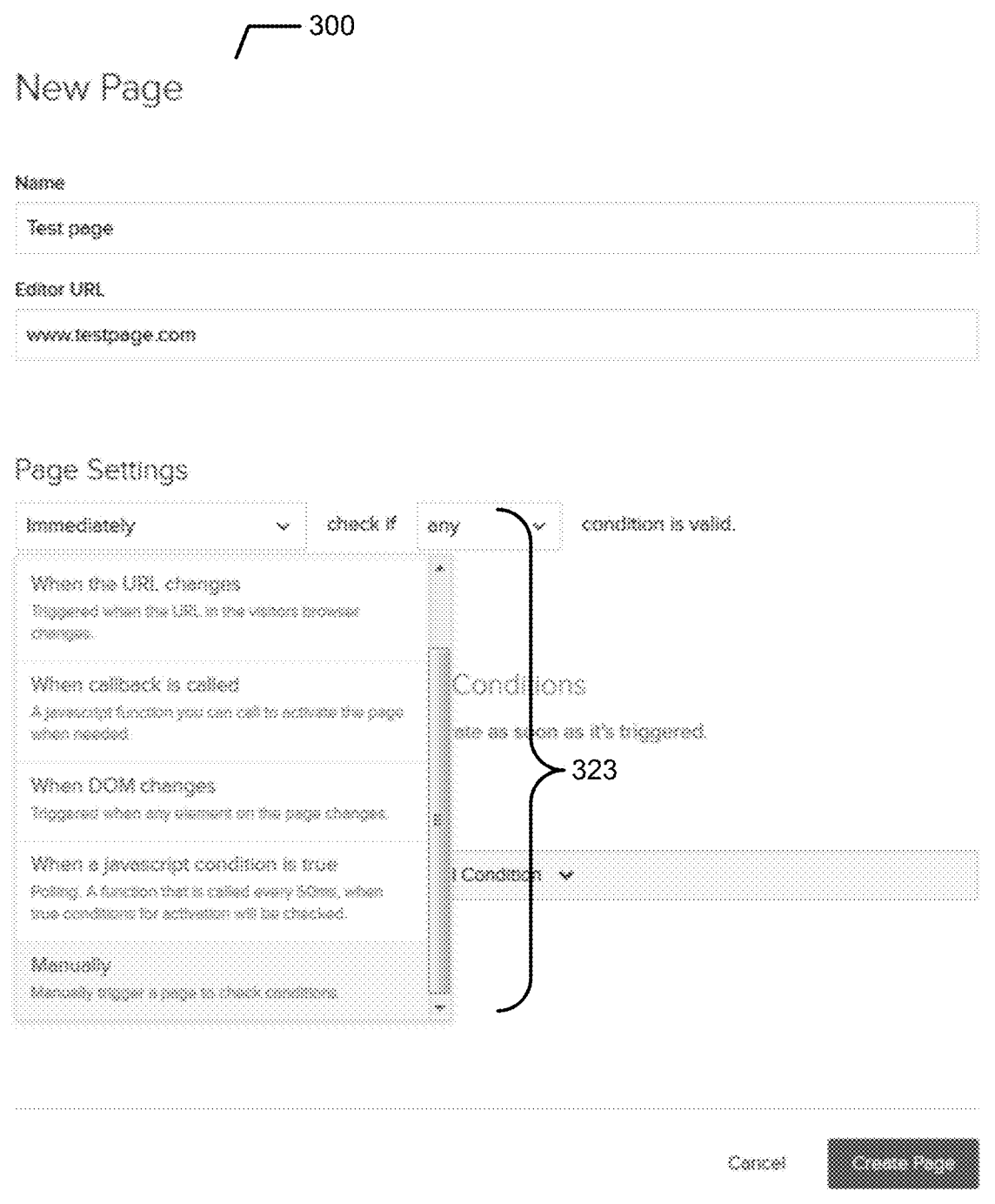

FIGS. 3C-3D illustrate an example interface 300 for configuring trigger conditions for a smart page of a single-page web page. As described above in conjunction with FIG. 1, a trigger of a smart page describes when the client device 102 evaluates for a set of associated conditions and activates or deactivates the smart page based on the results of the evaluation. In one embodiment, a smart page can comprise one or more triggers of one or more different trigger types. When a trigger event occurs as defined by a smart page of a single-page web page, the client device 102 that is displaying the single-page web page evaluates the specified conditions associated with the trigger event and activates or deactivates the smart page based on instructions specified by the content provider 107. Triggers may be determined based on a function of the single-page web page, such as a timing or callback function, or interactions from a viewing user with the single-page web page.

For example, trigger types may include an "immediate" trigger type, a "URL changes" trigger type, a "callback" trigger type, a "DOM changes" trigger type, a "JavaScript polling condition" trigger type, and a "manual" trigger type. In one embodiment, an immediate trigger causes the client device 102, running the client-side snippet 121 within the browser 103, to evaluate whether conditions of the smart page are true for a single-page web page. A URL change trigger causes the client device 102 to evaluate for conditions of the smart page responsive to part or all of the URL of the single-page web page changing in the web browser 103 of the client device 102, including a hash change wherein a fragment identifier of the URL is changed. For example, client device 102 may use the client-side snippet 121 executing within the web browser 103 to evaluate for the conditions and triggers of the smart page. In one embodiment, any discussion of the client device 102 evaluating for conditions and triggers of the smart page relies upon execution of the client-side snippet 121 to evaluate for the conditions and triggers of the smart page for the single-page web page. A callback trigger may cause the client device 102 to evaluate for conditions of the smart page when a specified function (e.g., a Javascript function) or code of the client-side snippet 121 invokes its callback. A DOM change trigger may cause the client device 102 to evaluate for conditions of the smart page responsive to a change to a document object model (DOM) associated with the single-page web page. Lastly, a JavaScript polling condition trigger may cause the client device 102 to evaluate for conditions of the smart page at specified time intervals (e.g., every 50 ms).

In one embodiment as shown in the example interface 300, an affiliate of the content provider 107 accesses a list of the different types of triggers via a dropdown 323 accessible under the smart page settings. Each trigger is associated with an identifier 325 of the trigger (e.g., "When callback is called") and a description 327 of the trigger type (e.g., "A JavaScript function you can call to activate the page when needed"). An affiliate of a content provider 107 selects a trigger for the smart page by interacting with the dropdown 323.

Once the trigger for a smart page are established, the affiliate defines one or more conditions for the smart page for evaluation responsive to the established trigger. In one example as shown in the example interface 300, during configuration of a smart page, the smart page is initially given zero conditions as a default page setting. In the case that a smart page has no conditions, the client-side snippet 121 activates the smart page immediately upon receiving notification of a trigger event.

Figure 3E:
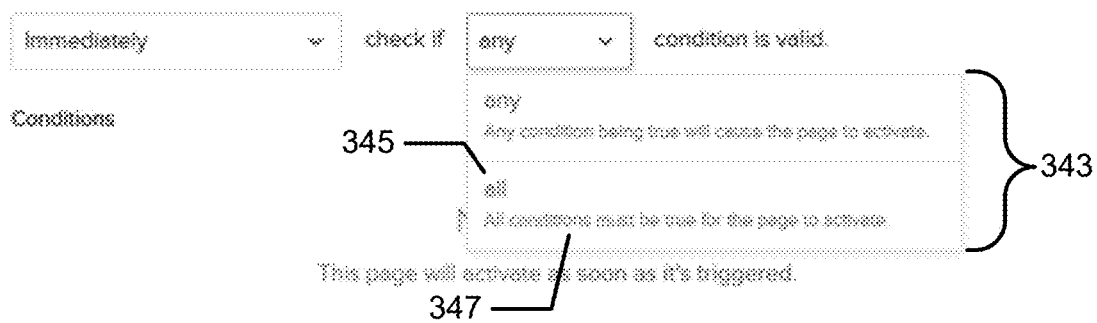

As shown in FIG. 3E, when a smart page has multiple conditions, the multiple conditions are configured such that the affiliate specifies whether an associated action is performed if any of the multiple conditions is valid or if all of the multiple conditions are valid. The example interface 300 of FIG. 3E includes a dropdown 343 allowing the affiliate of the content provider 107 to select whether the client device 102 performs an action based on any condition evaluating as true or responsive to all conditions evaluating as true. In one example, the dropdown 343 specifies an identifier 345 for the condition setting ("all") and a corresponding description 347 ("All conditions must be true for the page to activate"). In one embodiment, one or more conditions may additionally be associated with a "not" modifier, such that the condition returns true when the state described by the condition does not occur.

Figure 3F:
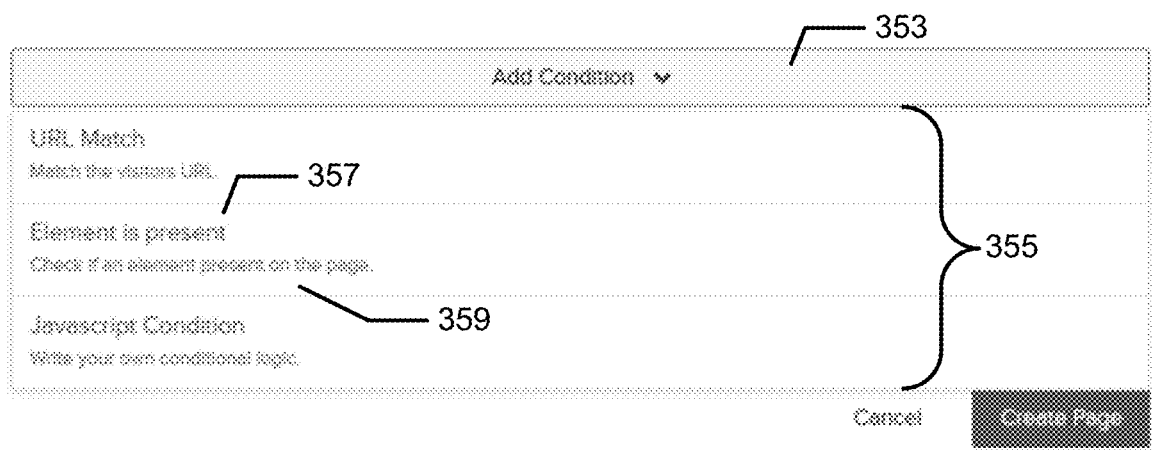

FIG. 3F illustrates an example interface 300 for adding a condition to a smart page for a single-page web page.

Responsive to an affiliate of a content provider 107 selecting an element 353 on the interface 300 to add a condition, the experiment setup module 113 updates the interface to display a dropdown area 355 including the different types of conditions that will cause the activation of the smart page of the single-page web page. For example, as shown in FIG. 3F, the different types of conditions that may be selected for the smart page includes a URL match condition, an element condition, and/or a Javascript condition. In the example interface 300, each condition is associated with an identifier 357 of the condition (e.g., "Element is present") and a description 359 of the condition (e.g., "Check if an element is present on the page").

In one embodiment, a URL match condition is a specified string or substring of a URL of the single-page web page that is monitored by the client device 102. For example, the client device 102 monitors the URL of the single-page web page to determine when the URL string for the single-page web page has updated from "www.testpage.com" to "www-.testpage.com/products" or "www.testpage.com/shoppingcart," which are examples of the URL string specified in the URL match condition. Responsive to the URL of the single-page web page matching the URL specified in the URL match condition, the smart page for the single-page web page is activated and a variation for the single-page web page may be displayed on the client device 102.

In one embodiment, an element condition is a specified element that is being monitored for in the single-page web page. For example, the client device 102 monitors the single-page web page to determine when the single-page web page is updated to include a button element "add to cart" (e.g., the specified element in the element condition). In another example, the client device 102 monitors the single-page web page to determine when the single-page web page is updated to include a user profile element, such as a username or a profile picture, associated with the viewing user. In one embodiment, the specified element must be actually visible to the viewing user and not merely present in the DOM to cause the activation of the smart page. Responsive to the specified element in the smart page being present (whether displayed or not displayed) in the single-page web page, the smart page for the single-page web page is activated and a variation for the single-page web page may be displayed on the client device 102.

In one embodiment, a Javascript condition is custom code that is being monitored for as being returned as "true" upon being activated in the client device 102. The Javascript condition allows an affiliate to define customized conditional logic that causes the activation of the smart page. For example, the affiliate specifies that the client device 102 is to monitor the single-page web page to determine when the smart page type is a product page thereby returning a value "true," which would cause the activation of the single-page web page and the display of a variation of the product page, for example. In another example, the affiliate specifies that the client device 102 monitors for when a viewing user has remained on the single-page web page for longer than a threshold time. Responsive to the viewing user being on the single-page web page for longer than the threshold time, the smart page for the single-page web page is activated and a variation for the single-page web page may be displayed on the client device 102.

Figure 3G:
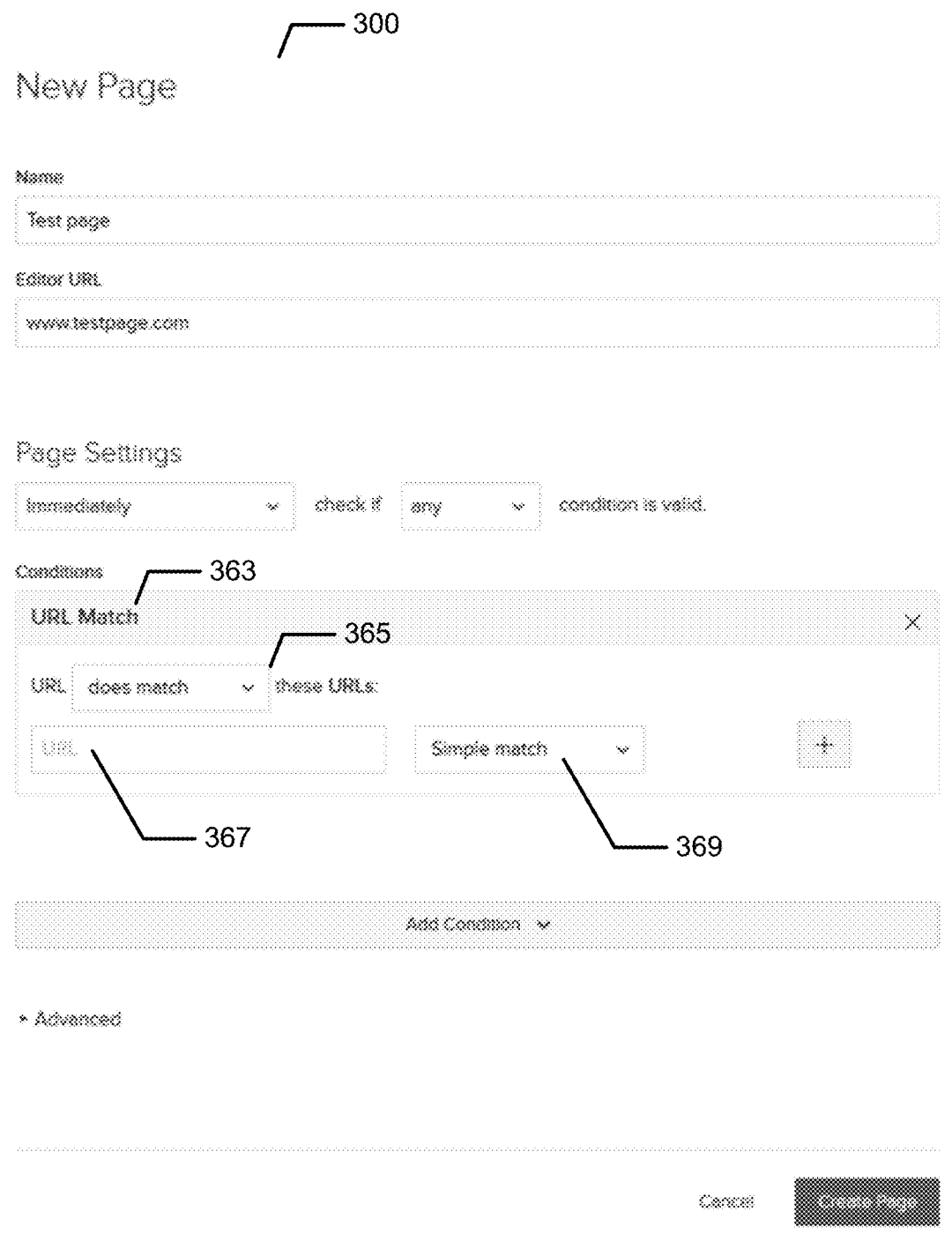
Figure 3H:
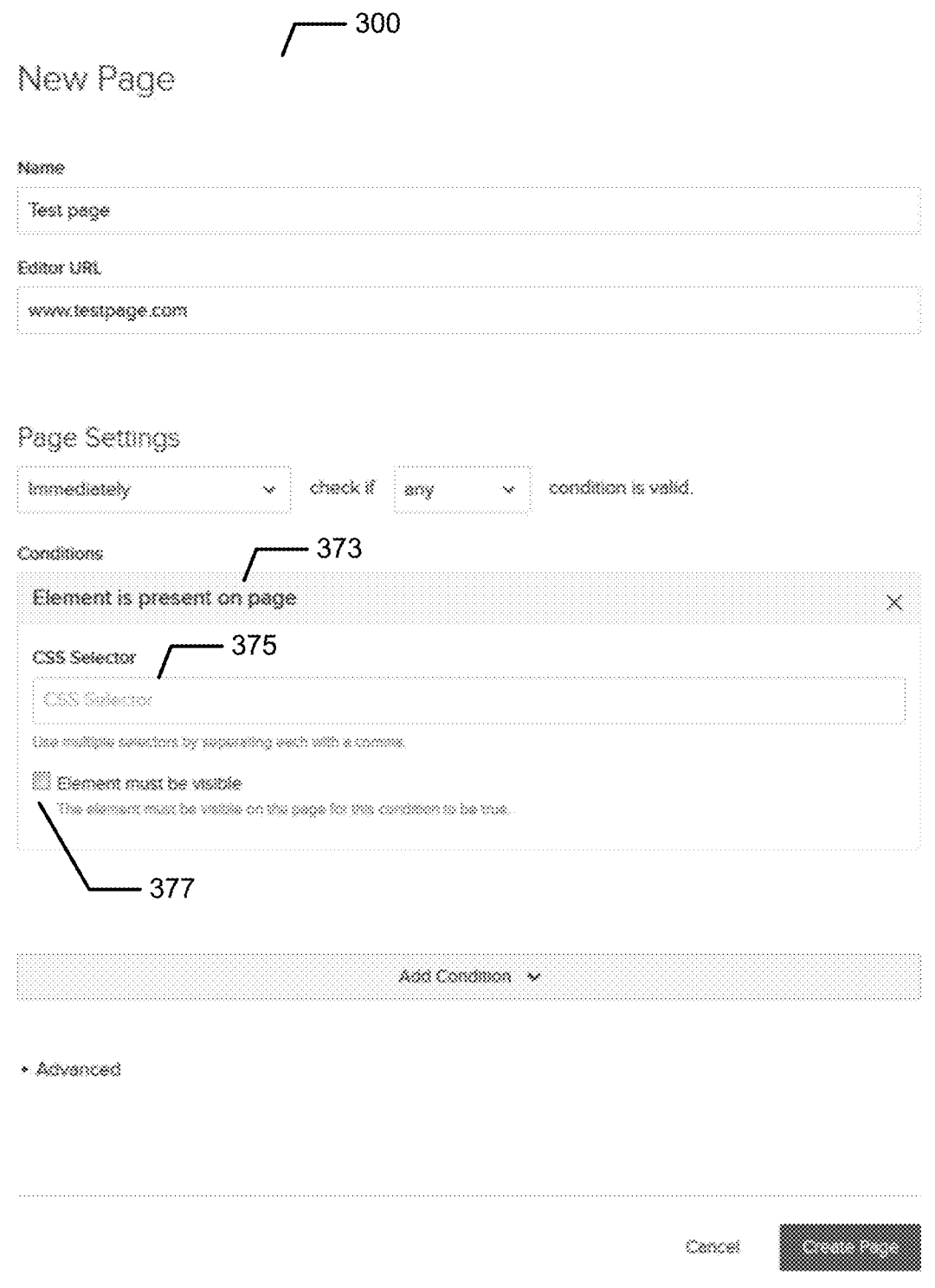
Figure 3I:
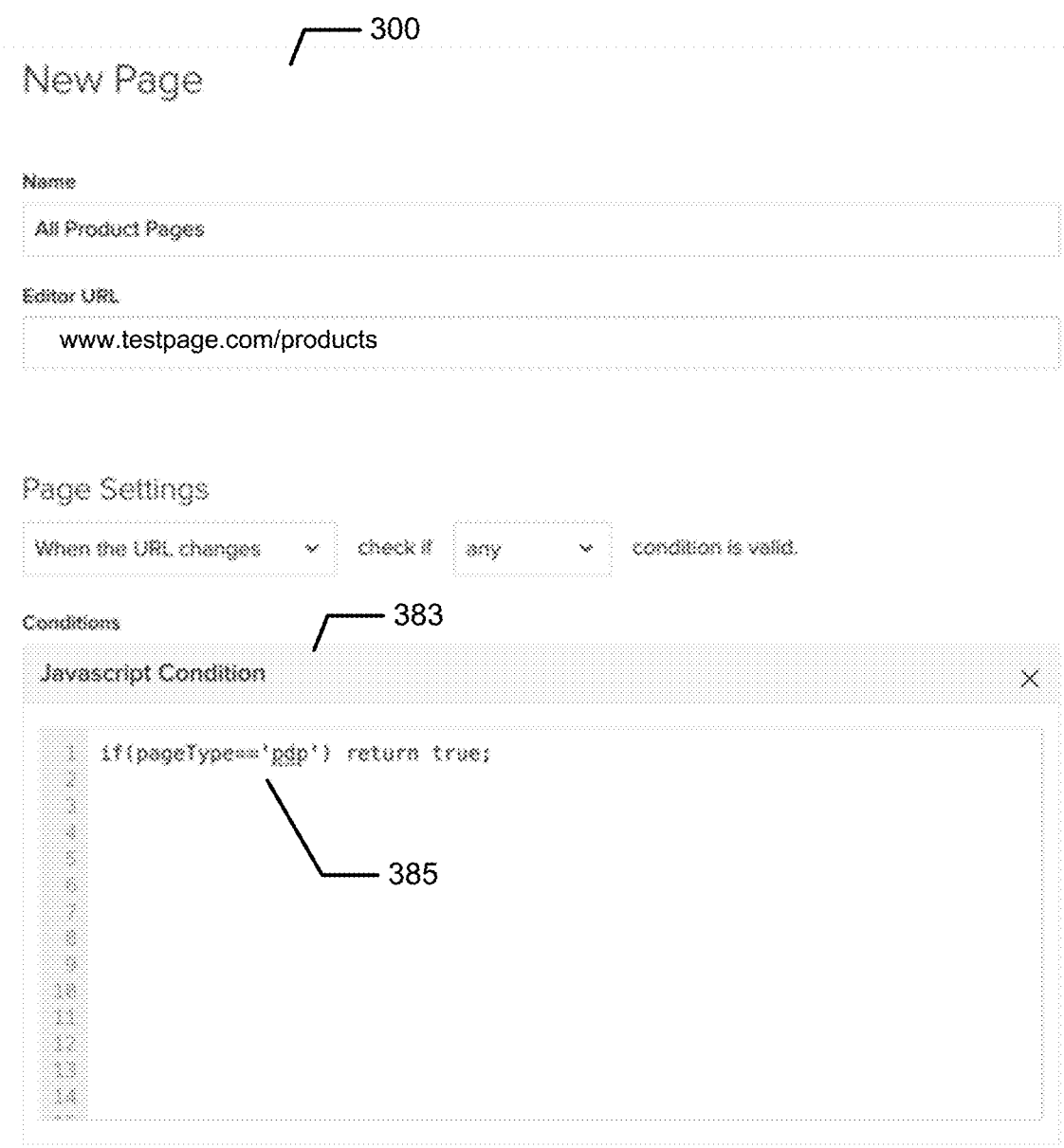

FIGS. 3G-3I illustrate example interfaces 300 for defining parameters (e.g., attributes) for condition types. In other embodiments with additional or different condition types, the interfaces may be different. Responsive to an affiliate of a content provider 107 selecting a condition type to add to the smart page for the single-page web page, the experiment setup module 113 updates the interface to display one or more parameters for the condition type. For example, as shown in FIG. 3G, responsive to a selection of the "URL Match" condition type 363, the interface 300 displays a set of options to allow for customization of the condition. The example interface includes elements, such as a dropdown element 365, allowing an affiliate of a content provider 107 to select whether the URL match condition is true when the URL does or does not match a specified URL 367 and the method of determining a match 369. For example, as shown in the dropdown element 365, the URL match condition evaluates to true when the URL of the single-page web page "does match" a set of specified URLs 367 based on a "simple match" 369 algorithm. The simple match algorithm determines whether the URL of the single-page web page matches a specified URL, but removes extraneous elements from the URL (e.g., a specified URL of "https://www.testpage.com/" will match "www.testpage.com").

In other embodiments, other matching methods are used. For example, the URL match condition uses an exact match algorithm, a substring match algorithm, or a regex match algorithm. The exact match algorithm determines whether the URL of the single-page web page matches a specified URL in full, including elements stripped by the simple match algorithm. The substring match algorithm determines whether at least a substring of the URL of the single-page web page matches a specified URL (e.g., a specified URL of "testpage.com" will match "www.testpage.com/product" and "www.testpage.com/product/11111"). The regex match algorithm determines whether the URL contains a substring that matches a specified regular expression pattern (e.g., "www.testpage.com/product/0005" and "www.testpage.com/product/5041" for a specified regular expression pattern "product/[0-7]").

FIG. 3H illustrates an example interface 300 generated responsive to a selection of the "Element is present" condition type 373. The example interface includes elements allowing an affiliate of a content provider 107 to select a CSS element 375 on the single-page web page and an option to specify that the selected element must be visible to a viewing user of the single-page web page 377 for the condition to evaluate to true. For example, an affiliate of the content provider 107 specifies that the condition evaluates to true when certain content (i.e., an element of the single-page web page) is displayed on the single-page web page. In one embodiment, the content is a button on a product page allowing the viewing user to add an item to a shopping cart. In another example, an affiliate of the content provider 107 specifies that the condition evaluates to true when certain content (e.g., an expanded navigation menu) is present on the single-page web page. In another embodiment, a single-page web page uses a content element tracker as an indicator to determine whether a specific content element is visible on a specified page. When the content element is displayed on a client device 102, the web browser 103 identifies that the specified page is being displayed. In one embodiment, the content element tracker is included on a purchase receipt page or a product page to determine when a viewing user makes a purchase or views a specified product.

FIG. 3I illustrates an example interface 300 generated responsive to a selection of the "JavaScript Condition" condition type 383. The example interface includes a text box element allowing an affiliate of a content provider 107 to input code 385 for the custom JavaScript condition. The client device 102 will evaluate the single-page web page for the custom JavaScript condition specified by the inputted code 385 responsive to the trigger event associated with the smart page occurring on the single-page web page. In the example shown, if a page type of the single-page web page is a product listing page (PDP), then the condition is met. In other examples, the code 385 may evaluate other factors of the single-page web page or of the world (e.g., whether the clock of a client device 102 of a viewing user is at, past, or before a set time; whether the viewing user has interacted with an element prior to the code being called; etc.).

Figure 3J:
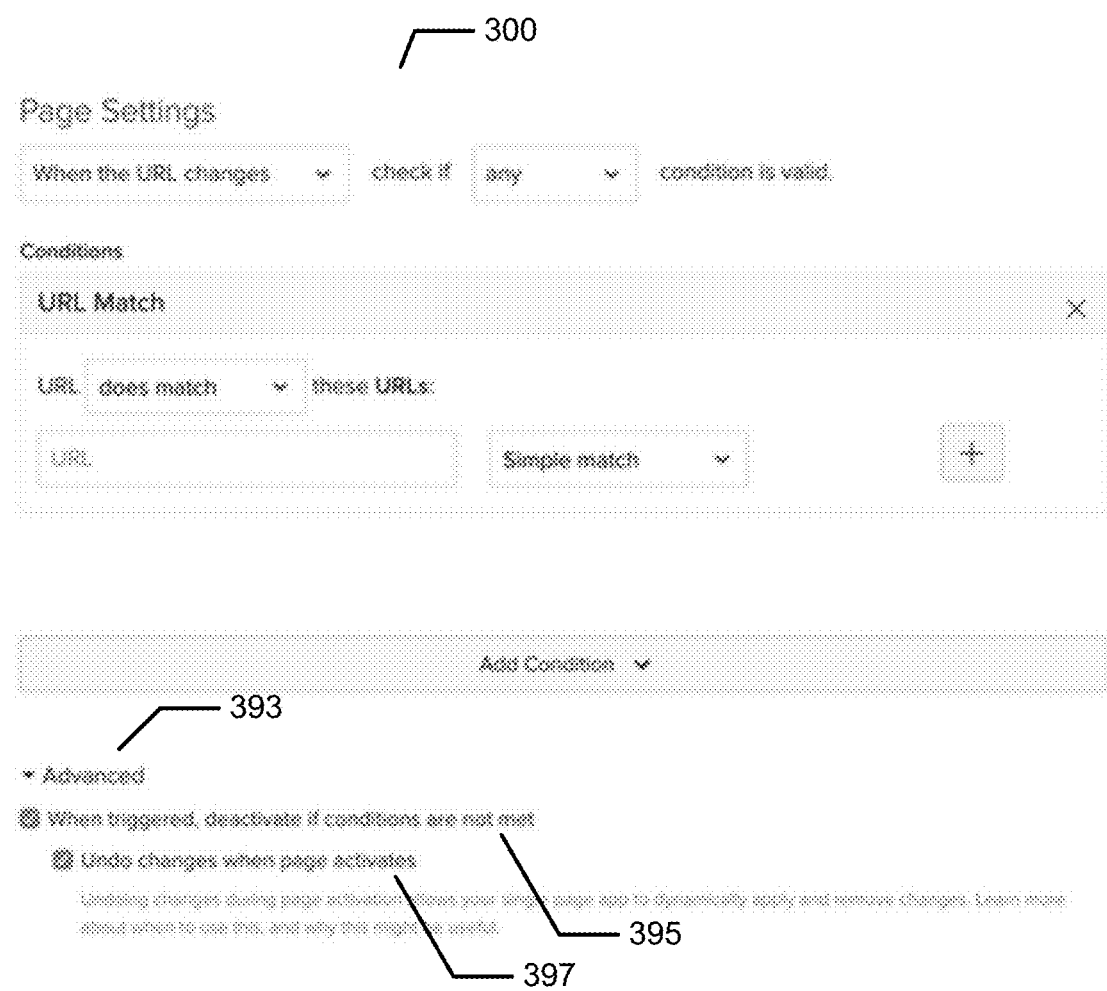

FIG. 3J illustrates an example interface 300 for establishing advanced settings for a smart page of a single-page web page. Responsive to an affiliate of a content provider 107 interacting with an element on the interface 300 to access advanced settings 393, the experiment setup module 113 displays one or more settings for the smart page. As shown in the example interface 300, advanced settings 393 include an option to deactivate the smart page when a trigger event occurs 395 and the conditions are not met and an option to undo changes made to the smart page when it activates 397. In one embodiment, event listeners for the deactivated smart page may additionally be deregistered such that future events do not trigger activation of the smart page. In other examples, advanced settings may include additional, fewer, or different options.

In one embodiment, the smart page also includes a definition of one or more variations to display on the client device 102 responsive to a condition in the smart page being valid (i.e., true). The one or more variations may be defined by the affiliate of the content provider 107.

The content provider 107 may also revise the specific distribution of the variations of the web page to the viewing users. For example, when the affiliate of the content provider 107 establishes a control variation and an experimental variation, the traffic allocation may be split between the two variations, such that half of the viewing users receive the control variation and the remaining half of the viewing users receive the experimental variation. The traffic allocation may be performed based on random assignment, based on a viewing user demographic (e.g., an age group associated with a viewing user; a past purchase or preference associated with a viewing user; external actions associated with a viewing user; and the like), based on a geographic location, or other similar factors. In other examples, the affiliate of the content provider 107 defines alternate distributions (e.g., wherein 80% of viewing users receive a control variation and 20% of viewing users receive an experimental variation; wherein 25% of viewing users receive a control variation and 75% of viewing users receive an experimental variation).

Returning to FIG. 1, the experiment setup module 113 additionally communicates the conditions and variations established for a smart page by an affiliate to a content delivery module 118. In one embodiment, this includes sending a set of configurations, code, and data that is loaded into the content delivery module 118 as experiment variation instructions.

The content delivery module 118 stores and delivers the experiment variation instructions. The content delivery module 118 stores the experiment variation instructions in the experiment database 117 and accesses the experiment database 117 responsive to a request to retrieve, update, or modify the experiment variation instructions. In one embodiment, the experiment variation instructions comprise of configurations, code, and data that can be loaded into a client-side snippet 121 and used to apply the variations to a single-page web page. The experiment variation instructions can further include the particular triggers and conditions specified by a third-party content provider 107 for applying variations to a web page.

The experiment database 117 stores multiple variation testing records that describe variation tests conducted by the experiment system 105. In one embodiment, each variation test record is associated with a web page (e.g., a static web page, a single-page web page, etc.), an experiment identifier unique to the variation test, and identifiers of different variations of a web page involved in the variation test. A variation test record may also include a description of the change or changes made to each variation of the web page compared to the control variation of the web page.

The identification (ID) assignment module 115 generates user identifiers for users of client devices 102. In one embodiment, a user identifier is a string of numbers that is unique to a particular client device 102 to the experiment system 105. Thus, client device 102A may have a different user identifier than the user identifier for client device 102B. In one embodiment, the ID assignment module 115 generates a user identifier by automatically incrementing the value of the last user identifier generated by the ID assignment module 115 using an auto increment function. Alternatively, the ID assignment module 115 generates a unique random number and assigns the unique random number as a user identifier for a client device 102. In another embodiment, the ID assignment module 115 may receive a user identifier generated by the client device 102 (for example, a device ID of the client device 102) or by the client-side snippet 121 loaded on the web page of the client device 102. In yet another embodiment, user identifier may be input by the user into the client device 102 and received by the ID assignment module 115. The ID assignment module 115 stores user identifiers in the ID database 116. The ID database 116 stores and maintains records of all assigned user identifiers from the IDS assignment module 115 and client devices 102.

In one embodiment, responsive to the content provider 107 receiving a request for a web page from a client device, the ID assignment module 115 communicates with the client device 102 to determine whether the client device 102 already has a user identifier. In another example, the ID assignment module 115 queries the client device 102 to determine whether the client device 102 includes a stored cookie that comprises a user identifier for the client device 102. If the client device 102 lacks a cookie with a user identifier for the client device 102, the ID assignment module 115 may query the client device 102 to transmit the user identifier. Alternatively, the ID assignment module 115 generates a user identifier for the client device 102 and communicates the user identifier to the client device 102 for storage in a cookie at the client device 102 if the client device 102 lacks a cookie with a user identifier. Alternatively, the client-side snippet 121 loaded on the web page generates a cookie containing a randomly generated user identifier and sends this user identifier to assignment module 115. The client device 102 may continue to use the user identifier generated by the ID assignment module 115 for subsequent requests for the web page.

As mentioned above, the client device 102 includes a web browser 103. When a viewing user of the client device 102 accesses a single-page web application 119, the client device communicates via the network 109 to retrieve the single-page web application 119 from the content provider 107 so that the client device can display any single-page web pages of the single-page web application 119 to the viewing user. The single-page web application 119 includes an embedded client-side snippet 121 and web page content 123, which are executed in the web browser 103 of the client device 102. The web page content 123 may include, for example, text, images, links, and other elements displayed on the single-page web application 119. The client-side snippet 121 includes a set of instructions for retrieving instructions for executing the variation test from the experiment system 105. In one embodiment, the client-side snippet 121 transmits a request to the experiment system 105 for instructions for executing the variation test responsive to execution of the client-side snippet, the instructions including triggers and conditions established for the variation test by the content provider 107.

The client-side snippet 121 additionally captures user interactions and information about the state of the single-page web application 119. When a condition of a smart page for the single-page web page is satisfied, the client-side snippet 121 executes the variation test. Based on the logic of the experiment variation instructions, the client-side snippet 121 loads a control or a variant of a single-page web page of the single-page web application 119 for display to the viewing user of the client device 102. In one embodiment, the client-side snippet 121 is assigned to a control or a variant randomly. In another embodiment, the content provider 107 can customize how users are grouped into a control or variation version of the single-page web application 119. For example, the content provider 107 can select specific groups of visitors for a default web page or a variation based on attributes of those visitors. For example, first time visitors to the single-page web application 119 are selected for a variant of the web page. In another example, visitors that interact with specified elements on the page (e.g., adding an item to an online cart; indicating an interest in an item) are selected for a variant of the single-page web application 119.

The client-side snippet 121 captures user interactions with web page content 123 and transmits information about the user interactions to the experiment system 105 for storage in the experiment database 117. For example, information about user interactions includes whether a viewing user clicked through a particular button, completed a purchase, spent a threshold amount of time on the single-page web application 119, and the like. The information about user interactions is processed and aggregated by the experiment system 105, for example, to determine whether a variant of the single-page web application 119 performs better than the default web page. The results may then displayed to an affiliate of the third-party content provider 107.

(b) Conducting Experiments on Smart Pages for Single-Page Applications

Figure 4A:
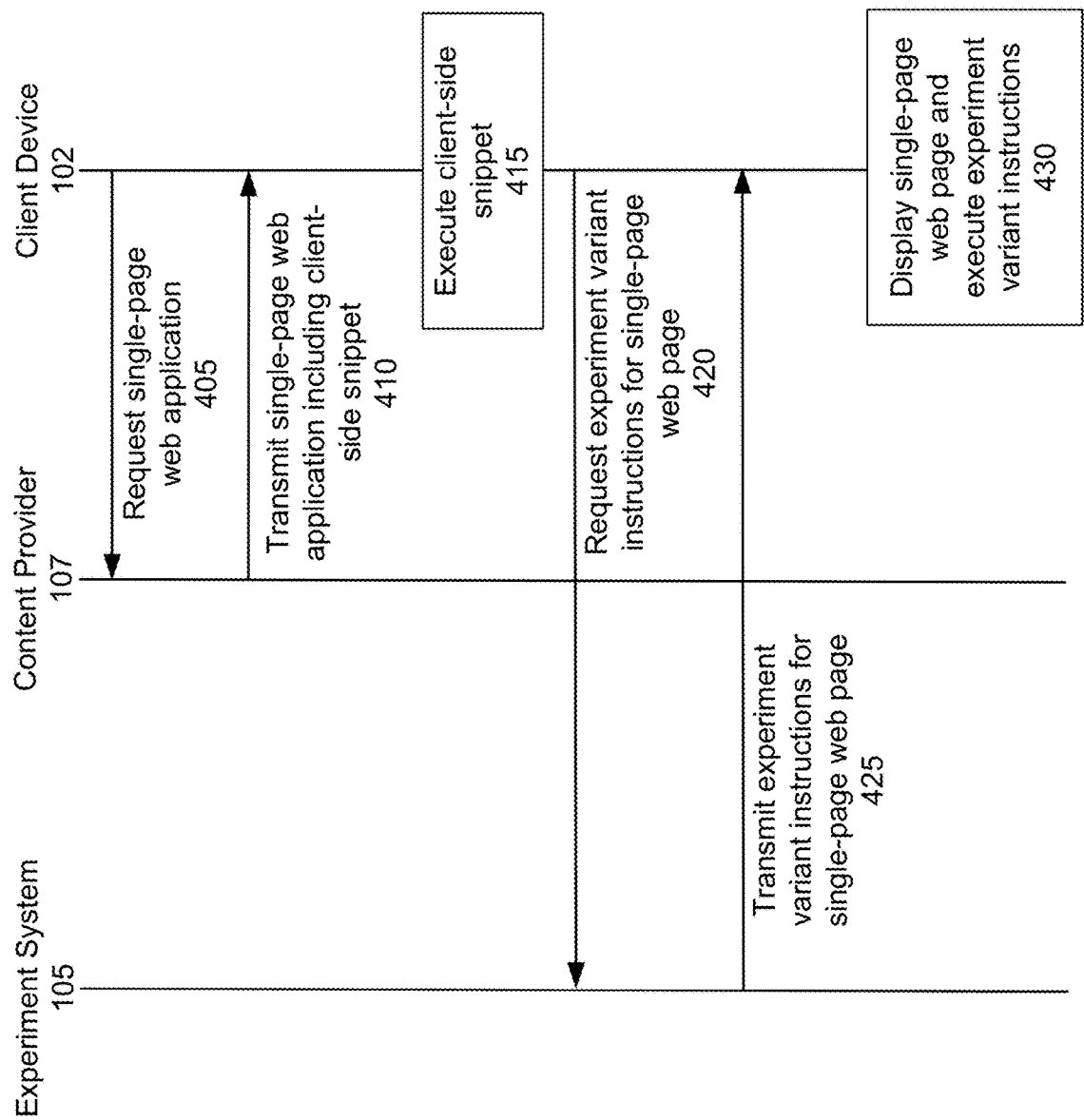
FIGS. 4A-4B are transaction diagrams illustrating interactions between an experiment system, a content provider, and a client device, in accordance with an embodiment.
Figure 4B:
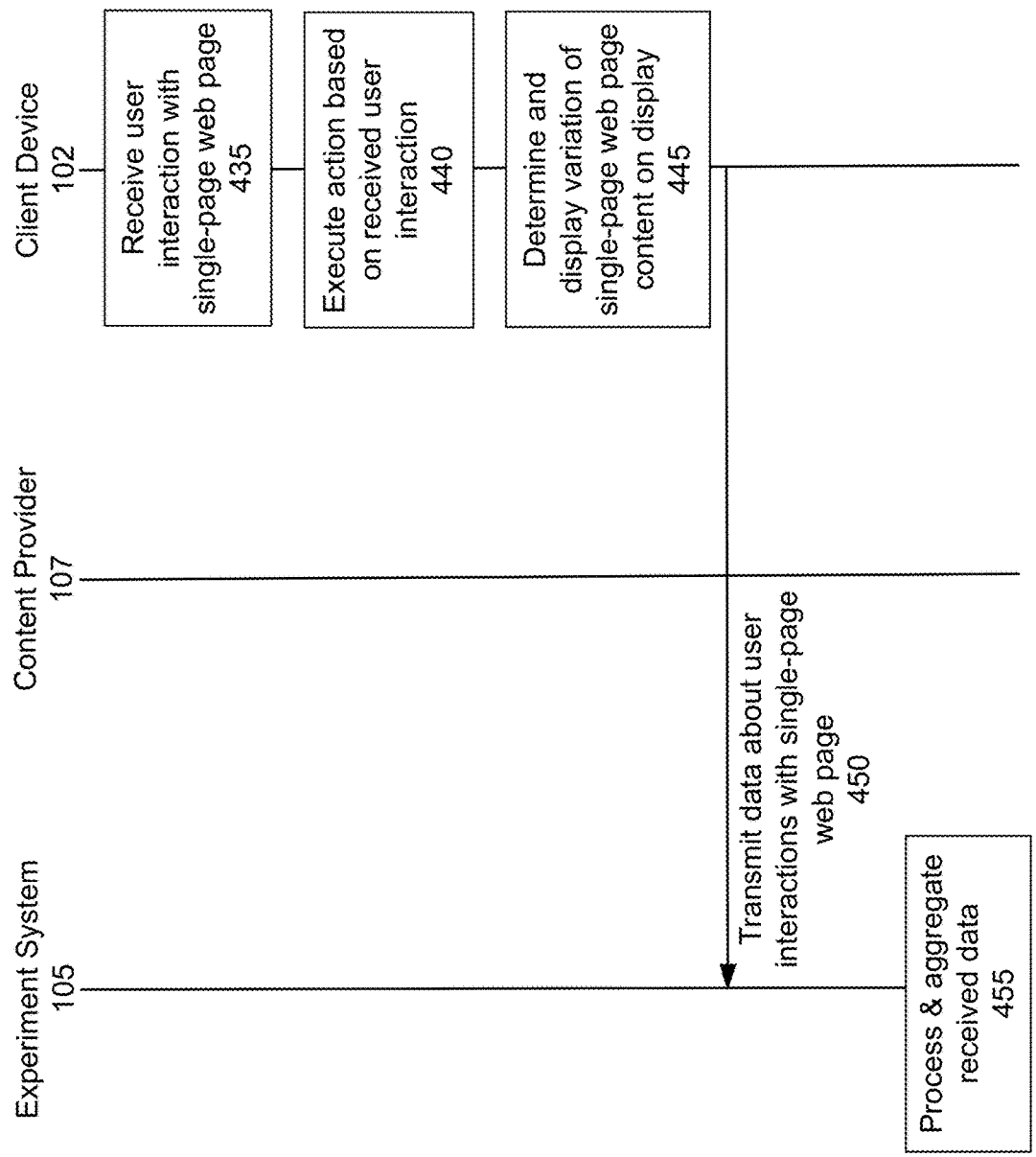

FIGS. 4A-4B are transaction diagrams illustrating interactions between an experiment system 105, a content provider 107, and a client device 102. A client device 102 requests 405 a single-page web application 119 from a content provider 107. The content provider 107 transmits 410 the single-page web application 119 to the client device 102. The transmitted single-page web application 119 includes a client-side snippet 121. The client-side snippet 121 includes instructions that cause the client device 102 to retrieve from the experiment system 105 additional configurations or variations to perform alterations on the web page or its content, including, in one embodiment, the triggers and conditions for one or more smart pages. The client device 102 executes 415 the client-side snippet 121 which causes the client device 102 to request 420 instructions for executing experiment variants for a single-page web page of the single-page web application 119 from the experiment system 105. The experiment system 105 transmits 425 the experiment variant instructions for the single-page web page of the single-page web application 119 to the client device 102. The instructions include the triggers and conditions for the smart pages and where they are stored in the client-side snippet 121 within the web browser 103. The client device 102 displays 430 the single-page web page to a user of the client device 102 and executes the web browser 103 and the client-side snippet containing the experiment variant instructions. The client-side snippet 121 contains instructions to allow it to interact with the web browser 103, including instructions to interact with the web browser's APIs. For example, the client-side snippet 121 contains instructions to interact with the MutationObserver API. The MutationObserver API provides the ability to watch for changes being made to the DOM tree by identifying a target element. The target element may be a single node in the DOM tree or a subtree including multiple nodes. When a change occurs to the identified target element, such as adding, modifying, and removing nodes or node attributes and modifying text data, additional code can be configured using the MutationObserver API to watch for changes and transmit them to the client-side snippet 121. In another example, the client-side snippet 121 interacts with a site visitor's web browser session history. In one example, the client-side snippet 121 detects when a URL changes even if the full page does not reload in order to execute experiments.

Referring to FIG. 4B, the client device 102 receives 435 a user's interactions with the single-page application 119 that has been loaded onto the browser running on the client device 102. For example, the client device 102 identifies a user interaction of clicking or selecting a menu item of the single-page web page and passes the user interaction to the browser for execution by the single-page application 119. The client device 102 executes 440 an action associated with the user interaction in the browser. The action executed by the client device 102 includes, displaying the selected menu item. The client device 102 determines 445 a variation of the single-page web page to display to the user based on the experiment variant instructions and the user interactions, as discussed in conjunction with FIG. 5. Responsive to the client device 102 displaying the determined variation of the single-page web page, the client device 102 using the client-side snippet may monitor for changes to the state of the single page web application 119 and transmit 450 data about user interactions with the single-page web page to the experiment system 105. The experiment system 105 processes and aggregates 455 the received data.

Figure 5:
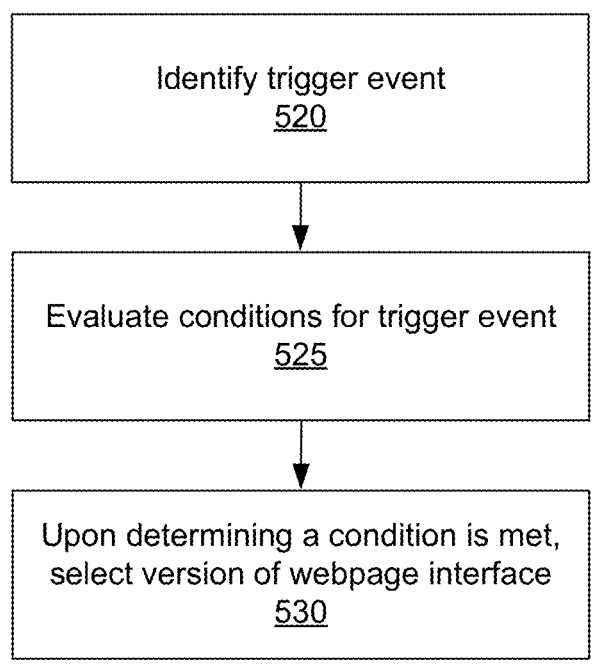
FIG. 5 is an example flowchart of a process for determining a variation of a web page for a content variation experiment, in accordance with an embodiment.

FIG. 5 is an example flowchart of a process for determining a content variation of a web page for a content variation experiment. The steps of FIG. 5 may be performed on the client device 102. Some or all of the steps may be performed by other entities in other embodiments. In addition, other embodiments may include different and/or additional steps, and the steps may be performed in different orders.

The client device 102 evaluates the state of the single-page application 119 to identify 520 whether a trigger event associated with the single-page web page has occurred. As previously discussed, trigger events are received as part of the experiment variant instructions received from the experiment system 105. As previously discussed in conjunction with FIGS. 3A-3J, the trigger event describes when the client device 102 evaluates for conditions associated with the smart page of the single-page web page. For example, the trigger event may include a selection of an element of the web page, a change to the URL of the web page, a polling event that occurs at specified time intervals, a manual trigger, or another event. Thus, the client device 102 monitors the single-page web application 119 for the occurrence of the trigger event. In one embodiment, the client-side snippet 121 is monitoring the single-page web application 119 by interacting with the above-described web browser APIs.

The client-side snippet 121 then evaluates 525 conditions associated with the trigger event responsive to the trigger event occurring on the single-page web page. As previously discussed in conjunction with FIGS. 3A-3J, the condition evaluates the state of the single-page web page. Each smart page can have zero or more conditions, and any combination of condition types. For example, conditions may include a specified URL match, an element presence on the web page, an element visible on the web page, custom code associated with the web page, and other state information associated with the web page. As the user is interacting with the web page, the content of the web page is dynamically updated. The client device 102 monitors the updated content to determine whether one or more conditions are met. Upon determining that one or more conditions is met, the experiment is activated and the client device 102 selects 530 a version (e.g., the control or the variant) of the updated content of the web page interface to display to the viewing user as specified in the experiment variant instructions.

For example, if the user of client device 102 clicks on a menu item on the single-page web page, the content elements on the single-page web page change, reflecting that the user has navigated to the menu item they clicked on. The client device 102 detects that the content element has changed on the page. In other examples, the client device 102 detects that a URL change has occurred. In one embodiment, the client device 102 evaluates the conditions (for example, a content element exists on the page) and, if the conditions evaluate to true, the smart page activates that evaluates the experiment for that set of conditions.

Returning to FIG. 4B, the client device 102 displays 445 the determined variant of the single-page web page to the user. The client device 102 identifies and transmits 450 data about user interactions with the single-page web page to the experiment system 105. For example, the client device 102 identifies whether a user clicks on elements of the single-page web page, makes a purchase, closes out, or otherwise interacts with the variant of the single-page web page. The experiment system 105 processes and aggregates 455 the received data for analysis.

(c) Computer Architecture

Figure 6:
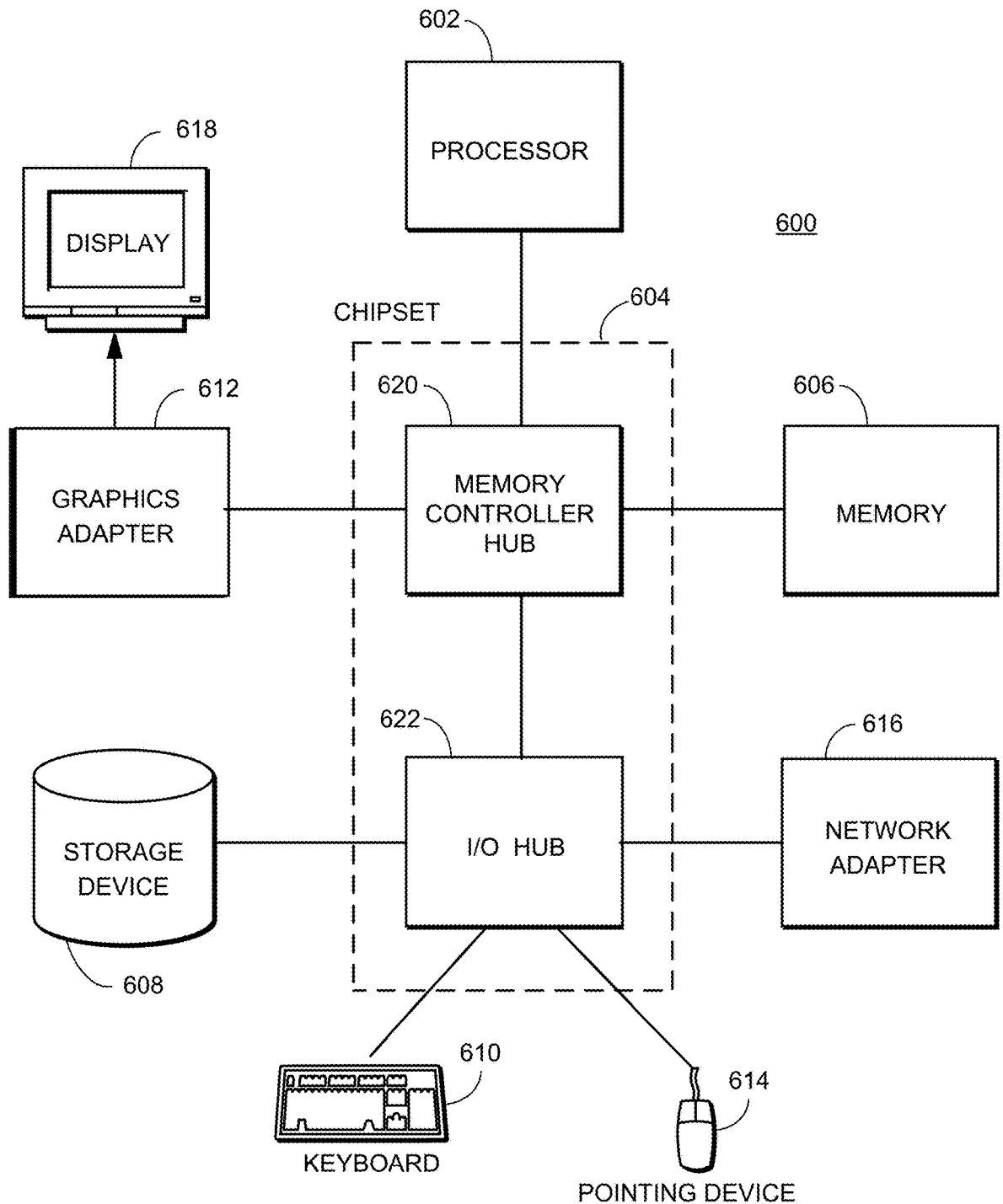
FIG. 6 is a high-level block diagram illustrating physical components of a computer used as part or all of one or more of the entities described herein in one embodiment.

FIG. 6 is a high-level block diagram illustrating physical components of a computer 600 used as part or all of one or more of the entities described herein in one embodiment. For example, instances of the illustrated computer 600 may be used as a server operating the messaging system 130. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O hub 622. In another embodiment, the memory 606 is coupled directly to the processor 602 instead of the chipset 604. In one embodiment, one or more sound devices (e.g., a loudspeaker, audio driver, etc.) is coupled to chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600. The graphics adapter 612 displays images and other information on the display 618. The network adapter 616 couples the computer system 600 to a local or wide area network.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

(d) Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method of determining a variation of a web page to display on a client device, the method comprising:
    displaying the web page received from a content provider on the client device, wherein the web page comprises a plurality of content items;
    displaying, via a graphical user interface (GUI), a plurality of conditions to control a display of the variation of the web page, a trigger event defining when to evaluate the plurality of conditions for the web page, and a condition setting specifying how many of the plurality of conditions are to be met for the variation of the web page to be displayed,
    wherein one or more of the plurality of conditions comprises conditional logic describing a state of the web page that causes the client device to select the variation of the web page, and
    wherein the conditional logic comprises executable code to be executed by the client device to determine if the one or more of the plurality of conditions has been met;
    receiving a user interaction, via the GUI, with the web page;
    determining, by the client device, a content update of the web page responsive to the user interaction, the content update determined without the client device requesting the content update from the content provider; and
    based on the trigger event being activated to cause at least one of the plurality of conditions to be evaluated and responsive to detecting that a uniform resource locator (URL) of the web page at least partially matches a URL string specified in the at least one of the plurality of conditions, displaying the variation of the web page,
    wherein the variation of the web page comprises the determined content update, and
    wherein the determined content update comprises an update to an attribute of at least one of the plurality of content items of the web page.

2. The method of claim 1,
    wherein the GUI comprises a matching method for determining whether the URL of the web page at least partially matches the URL string specified in the at least one of the plurality of conditions.

3. The method of claim 1, wherein the one or more of the plurality of conditions comprises an element condition that a graphical element of the plurality of content items of the web page matches a predetermined graphical element specified by the element condition.

4. The method of claim 1,
    wherein the GUI comprises an input field configured to receive input providing the conditional logic.

5. The computer-implemented method of claim 1, wherein a second condition of the plurality of conditions is selected from a second list of conditions via the GUI.

6. The computer-implemented method of claim 1, further comprising:
    receiving the web page from the content provider, the web page including code specifying instructions for the client device to request experiment instructions from an experiment system that is distinct from the content provider;
    requesting the experiment instructions from the experiment system responsive to execution of the code; and
    receiving the experiment instructions from the experiment system, the experiment instructions defining the one or more of the plurality of conditions.

7. The computer-implemented method of claim 6, wherein the experiment instructions further define the trigger event that is indicative of when to evaluate whether the one or more of the plurality of conditions has been met.

8. The method of claim 7, further comprising:
    monitoring the web page for the activation of the trigger event; and
    responsive to identifying the activation of the trigger event, begin monitoring the web page to detect the plurality of conditions.

9. The computer-implemented method of claim 8, wherein the trigger event is execution of the code specifying instructions for the client device to request experiment instructions from an experiment system.

10. The computer-implemented method of claim 8, wherein the trigger event is at least a portion of the URL of the web page changing.

11. The computer-implemented method of claim 8, wherein the trigger event is execution of a function associated with the web page.

12. The computer-implemented method of claim 8, wherein the trigger event is a change in a document object model (DOM) of the web page.

13. A computer system for determining a variation of a web page to display on the computer system, the computer system comprising:
    a computer processor; and
    a non-transitory computer-readable storage medium storing executable code, the code when executed by the computer processor causes the computer processor to perform operations comprising:
        displaying the web page received from a content provider on the computer system, wherein the web page comprises a plurality of content items;
        displaying, via a graphical user interface (GUI) a plurality of conditions to control a display of the variation of the web page, a trigger event defining when to evaluate the plurality of conditions for the web page, and a condition setting specifying how many of the plurality of conditions are to be met for the variation of the web page to be displayed,
        wherein one or more of the plurality of conditions comprises conditional logic describing a state of the web page that causes the computer system to select the variation of the web page, and wherein the conditional logic comprises executable code to be executed by the computer system to determine if the one or more of the plurality of conditions has been met;

receiving a user interaction, via the GUI, with the web page;

determining a content update of the web page responsive to the user interaction, the content update determined without the computer system requesting the content update from the content provider; and based on the trigger event being activated to cause at least one of the plurality of conditions to be evaluated and responsive to detecting that a uniform resource locator (URL) of the web page at least partially matches a URL string specified in the at least one of the plurality of conditions, displaying the variation of the web page, wherein the variation of the web page comprises the determined content update, and wherein the determined content update comprises an update to an attribute of at least one of the plurality of content items of the web page.

14. The computer system of claim 13, wherein operations further comprise:

receiving the web page from the content provider, the web page including code specifying instructions for the computer system to request experiment instructions from an experiment system that is distinct from the content provider;

requesting the experiment instructions from the experiment system responsive to execution of the code; and receiving the experiment instructions from the experiment system, the experiment instructions defining the one or more of the plurality of conditions.

15. The computer system of claim 14, wherein the experiment instructions further define the trigger event that is indicative of when to evaluate whether the one or more of the plurality of conditions has been met.

16. A computer program product comprising a non-transitory computer-readable storage medium storing executable code for determining a variation of a web page to display on a computer system, the code when executed by a computer processor causes the computer processor to perform operations comprising:

displaying the web page received from a content provider on the computer system, wherein the web page comprises a plurality of content items;

displaying, via a graphical user interface (GUI) a plurality of conditions to control a display of the variation of the web page, a trigger event defining when to evaluate the plurality of conditions for the web page, and a condition setting specifying how many of the plurality of conditions are to be met for the variation of the web page to be displayed, wherein one or more of the plurality of conditions comprises conditional logic describing a state of the web page that causes the computer system to select the variation of the web page, and wherein the conditional logic comprises executable code to be executed by the computer system to determine if the one or more of the plurality of conditions has been met;

receiving a user interaction, via the GUI, with the web page;

determining a content update of the web page responsive to the user interaction, the content update determined without the computer system requesting the content update from the content provider; and based on the trigger event being activated to cause at least one of the plurality of conditions to be evaluated and responsive to detecting that a uniform resource locator (URL) of the web page at least partially matches a URL string specified in the at least one of the plurality of conditions, displaying the variation of the web page, wherein the variation of the web page comprises the determined content update, and wherein the determined content update comprises an update to an attribute of at least one of the plurality of content items of the web page.

17. The computer program product of claim 16, wherein the operations further comprise:

receiving the web page from the content provider, the web page including code specifying instructions for the computer system to request experiment instructions from an experiment system that is distinct from the content provider;

requesting the experiment instructions from the experiment system responsive to execution of the code; and receiving the experiment instructions from the experiment system, the experiment instructions defining the one or more of the plurality of conditions and a trigger event that is indicative of when to evaluate whether the attribute of the web page matches the one or more of the plurality of conditions.

\* \* \* \* \*